United States Patent [19]
Eaton, Jr.

[11] 3,787,715
[45] Jan. 22, 1974

[54] CONTROL CIRCUIT EMPLOYING DIGITAL TECHNIQUES FOR LOADS SUCH AS BALANCE WHEEL MOTORS

[75] Inventor: Sargent Sheffield Eaton, Jr., Warren, N.J.

[73] Assignee: RCA Corporation, New York, N.Y.

[22] Filed: Aug. 30, 1972

[21] Appl. No.: 284,907

[52] U.S. Cl.................... 318/130, 318/132, 58/23
[51] Int. Cl. ........................................ H02k 33/00
[58] Field of Search .................... 318/122–139; 58/23, 29, 28, 25

[56] References Cited
UNITED STATES PATENTS

| | | |
|---|---|---|
| 3,540,207 | 11/1970 | Keeler .................................. 58/23 |
| 3,553,957 | 1/1971 | Döme et al. ........................... 58/23 |
| 3,564,838 | 2/1971 | Fellrath et al. ...................... 58/23 A |
| 3,608,301 | 9/1971 | Loewengart ........................ 58/23 A |
| 3,737,746 | 6/1973 | Cielaszyk et al................... 318/130 |

Primary Examiner—Donovan F. Duggan
Attorney, Agent, or Firm—H. Christofferson; Henry I. Schanzer

[57] ABSTRACT

A circuit for supplying current pulses to a load which, for example, may be the coil of balance wheel motor, in response to selected control pulses derived from said coil and for inhibiting the supply of said current pulses in response to other pulses derived from said coil, where said other pulses include at least two closely spaced pulses and occur during the time interval between said selected control pulses.

9 Claims, 7 Drawing Figures

PATENTED JAN 22 1974 3,787,715

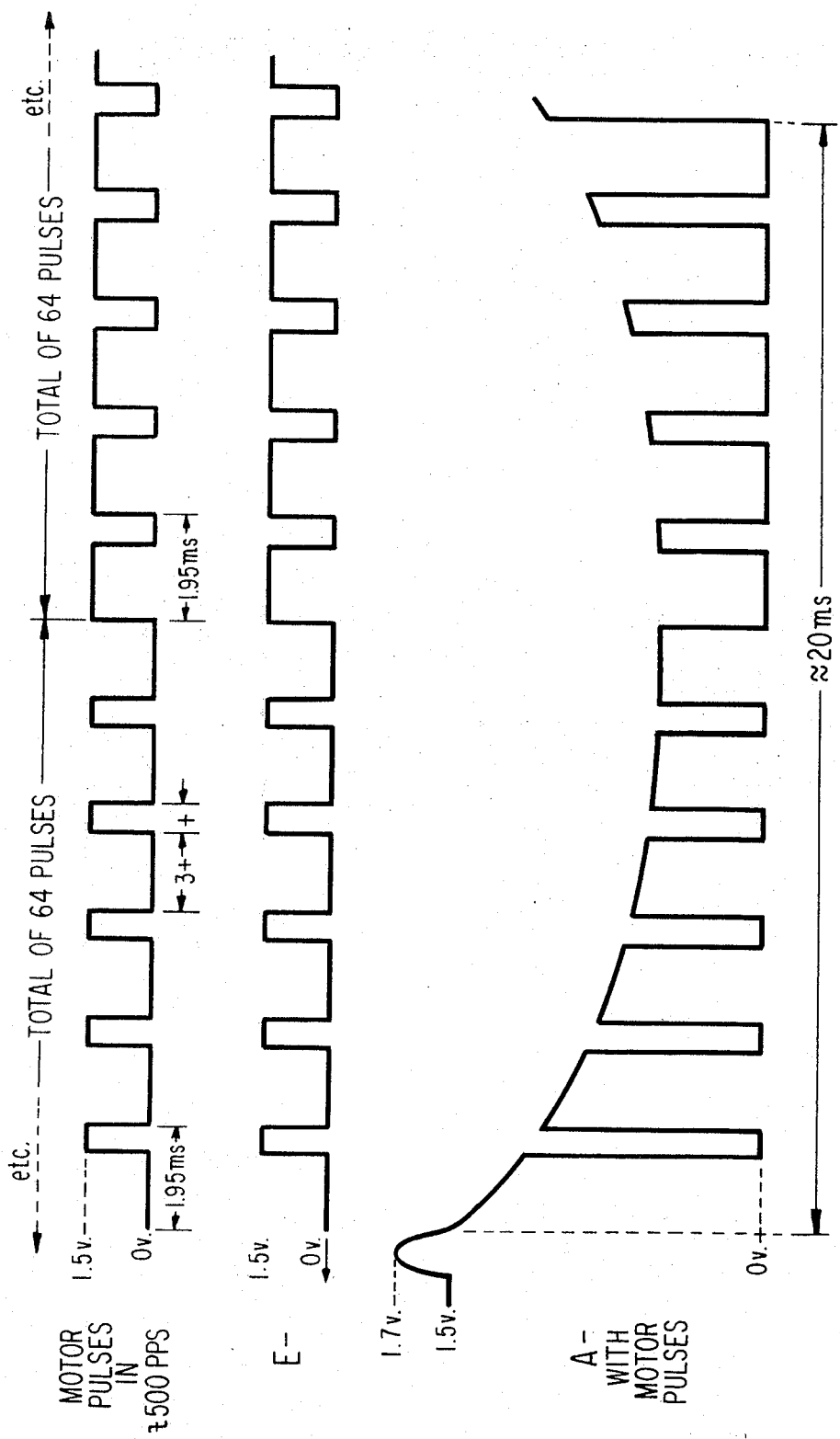

CONTROL CIRCUIT EMPLOYING DIGITAL TECHNIQUES FOR LOADS SUCH AS BALANCE WHEEL MOTORS

BACKGROUND OF THE INVENTION

The problem dealt with in this application may be, perhaps, best understood by referring to FIG. 1 which illustrates diagrammatically a balance wheel motor for a watch or a clock. FIG. 1 shows a rotating member 300 which may be part of a circular balance wheel or which may be a plain rectangular bar which is pivoted on a shaft 301 and is free to oscillate back and forth across a stationary coil 14. The member 300 has a magnet 302 at one end and a counterweight 304 at the other end. Assume now that one end of coil 14 is returned to a source of operating potential (e.g., 1.5 volts) and that the other end of the coil denoted by A is connected to an oscilloscope. The member 300 initially may be set into oscillation by shaking. As the member 300 oscillates back and forth across coil 14, the pulses shown in waveform A of FIG. 3 are produced at A and may be displayed on the scope. That is, as the member 300 travels in one direction across the coil, it induces a signal denoted as X and when it travels across the coil in the opposite direction, it induces a signal denoted as Y which is the mirror image of the X signal.

To ensure continued oscillation or reciprocating rotation, it is necessary to periodically supply pulses of current to the coil to supply energy to the system. That is, current pulses supplied to the coil create an electromagnetic field which attracts and/or repels the magnet 302 located on member 300 thereby sustaining the oscillatory motion of member 300. However, it may be desirable, for example, to supply current pulses to the coil 14 only during the presence of X signals and not during the presence of the Y signals. More generally, it may be desirable and/or necessary to perform some functions only on alternate signals (e.g., X signals) while inhibiting the performance of these functions when the remaining signals (e.g., Y signals) occur. This gives rise to the problem of sensing the desired signals and rejecting the others.

In known prior art circuits, sensing of the desired signals was done by attempting to compare differences in amplitude. It should also be mentioned that in the prior art a level detector was used to sense the transition of the signals.

A level detector generally, and as used herein, refers to a circuit which senses when an input signal exceeds a given bias level and which produces an output manifesting such occurrence.

A level detector may be used to digitize a signal. That is, it may be used to generate binary pulses in response to signals exceeding the bias level. But, in the known prior art circuits the level detector was biased to discriminate in amplitude between the desired and undesired pulses. This has disadvantages as discussed below.

For example, assume that a function is to be performed when the X signal goes negative and that therefore the X signals are to be sensed. However, the Y signal also has negative going excursions. As illustrated in waveform A the Y signals go down to 1.3 volts and the X signals go down to 1.1 volts. Therefore, before the system can detect the presence of an X signal, the X signal has to exceed 1.3 volts in the negative going direction. Obviously, by the time the X signal exceeds 1.3 volts, a considerable portion of the X signal width is lost. Therefore the time available to perform the desired and/or necessary function is considerably decreased and may be insufficient. Secondly, the prior art system requires a relatively accurate and reliable comparator. Such a comparator, which for a mass produced item such as watches would have to have extremely low power dissipation and also be small, reliable and cheap, connot at this point in time be reliably and economically mass produced.

Therefore, the prior art system, relying on analog techniques for sensing the presence of desired signals is unsatisfactory.

SUMMARY OF THE INVENTION

The invention resides in part in the recognition that first and second signals such as the X and Y signals, are transformed into first and second sets of pulses having different patterns. One set of pulses comprises a single pulse and the other set of pulses comprises at least two relatively closely spaced pulses. The two sets alternate having a relatively fixed period. The invention also resides in means for sensing said first and second pulse patterns and for supplying current pulses of first polarity to a load in response to pulses from saif first set of pulses, and for either inhibiting the supply of current to said load or for supplying curren pulses to said load of second polarity opposite to that of said first polarity in response to puses from said second set of pulses. The invention thus resides inpart in discriminating between teh two sets of pulses on the basisof the difference in their patterns rather than on the difference in signal amplitude.

BRIEF DESCRIPTION OF THE DRAWINGS

FIGS. 3A and 3B are waveforms of various signals and pulses associated with the circuit of FIG. 2;

DETAILED DESCRIPTION OF THE INVENTION

Figure 1:
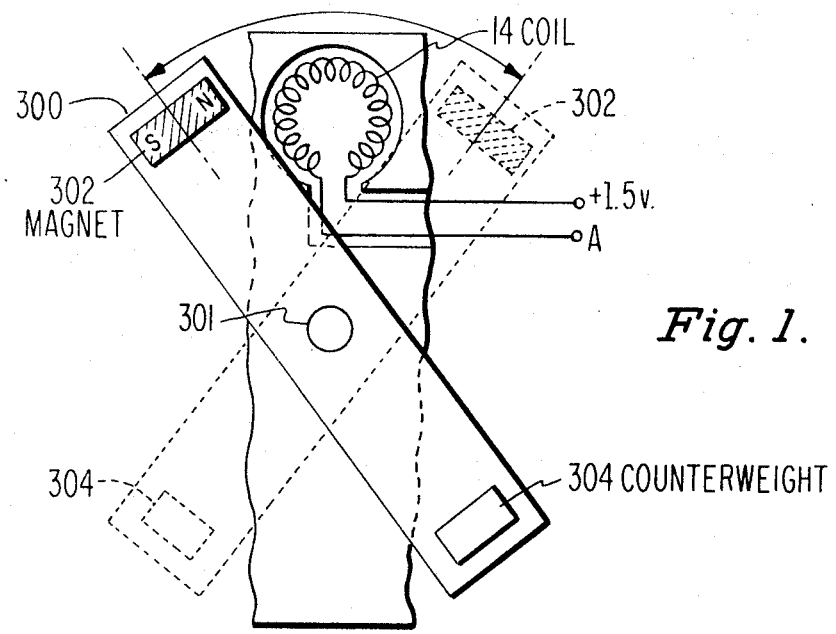
FIG. 1 is a diagrammatic representation of a balance wheel watch motor.
Figure 2:
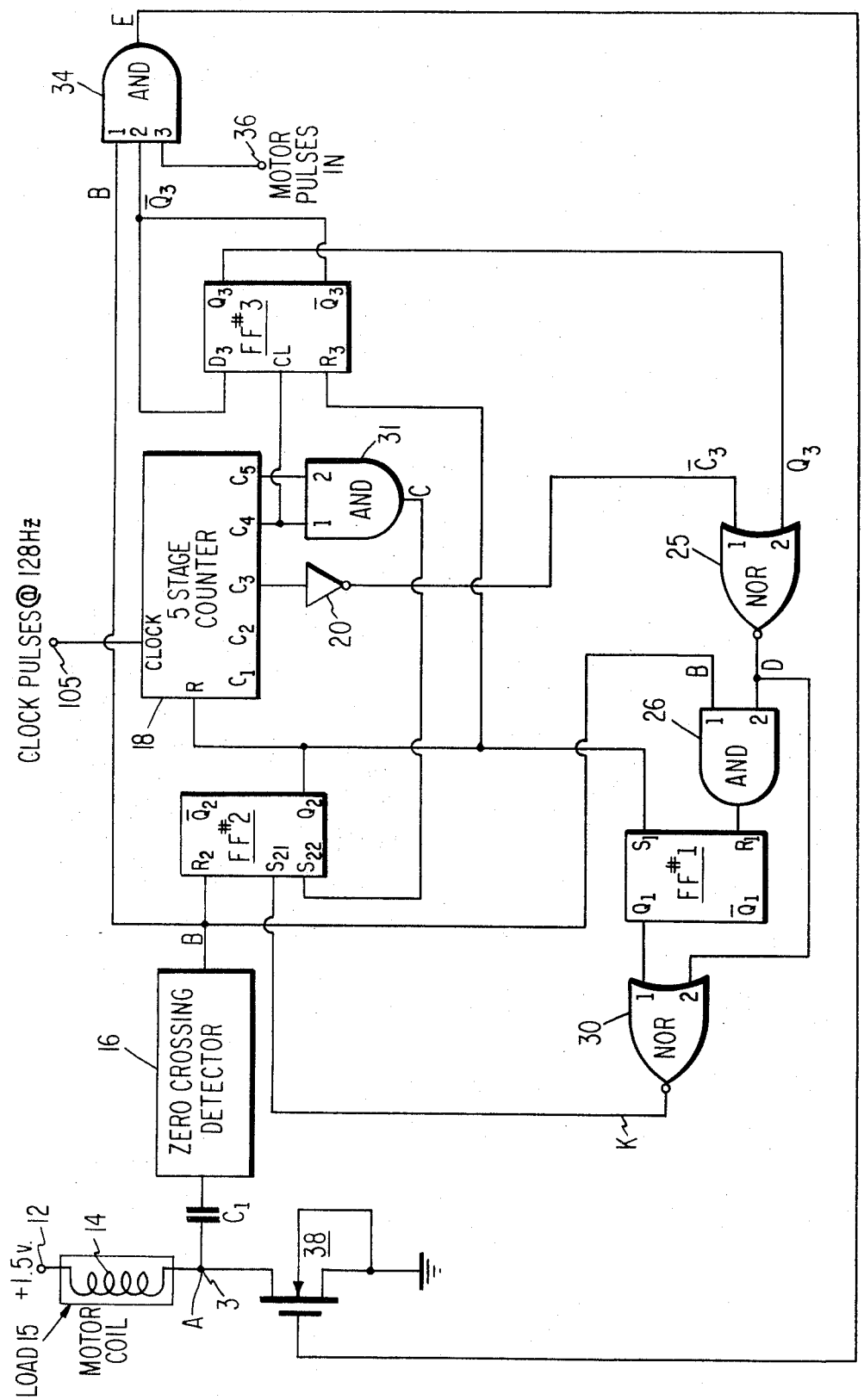
FIG. 2 is a schematic diagram of a circuit embodying the invention.

In the circuit of FIG. 2 the load 15 includes a coil 14 which may be the coil 14 of the balance wheel of FIG. 1. The coil 14 is connected between terminal 12 and node 3. The source-drain path of an N conductivity type switching transistor 38 is connected between node 3 and ground potential. With the balance wheel (not shown) rotating and with transistor 38 non-conducting, there is produced at node 3 the waveshape A shown in FIG. 3A. An operating potential which in this embodiment is nominally 1.5 volts is applied to terminal 12. Node 3 is alternating current (AC) coupled by means of capacitor C1 to zero crossing detector network 16.

Network 16 is of the type which produces a positive going output pulse whenever the (A) signals applied to its input crosses the 1.5 volt bias level going in a negative direction.

Figure 4:
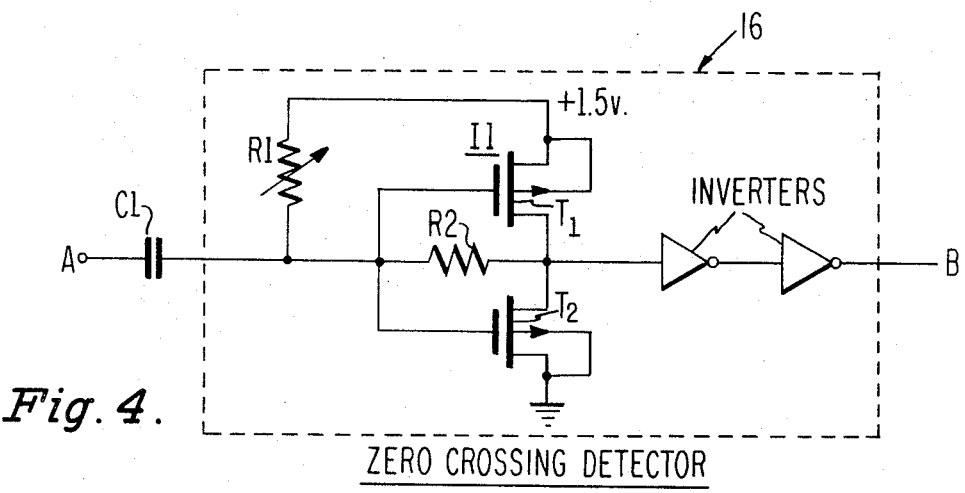
FIG. 4 is a schematic diagram of a zero crossing detector which may be used in the circuit of FIG. 2.

The term zero crossing detector as used herein may refer to a detector which senses a signal crossing zero volts or crossing a fixed direct current (DC) voltage level. For example, whenever the input signals at A go negative with respect to the fixed level of 1.5 volts DC, the zero crossing detector 16 senses the negative going crossings and produces the pulses shown in waveform B of FIG. 2. The zero crossing detector 16 may be any one of a number of known circuits adapted to perform this function. One such circuit is shown in FIG. 4. The circuit of FIG. 4 includes an amplifier 11 comprised of P-conductivity type transistor T1 having its conduction path connected in series with N-type transistor T2 between +1.5 volts and ground. A biasing resistor R1 is connected between 1.5 volts and the gate electrodes of transistors T1 and T2, and a feedback resistor R2 is connected between the gate electrodes and the drain electrodes of transistors T1 and T2. The output of amplifier 11 is then fed to two cascaded inverters to produce pulses of desired polarity at B. The values of R1 and R2 may be chosen so that with no AC signal at A the level at the output of amplifier 11 is low producing a signal level at B of zero volts.

Figure 3A:
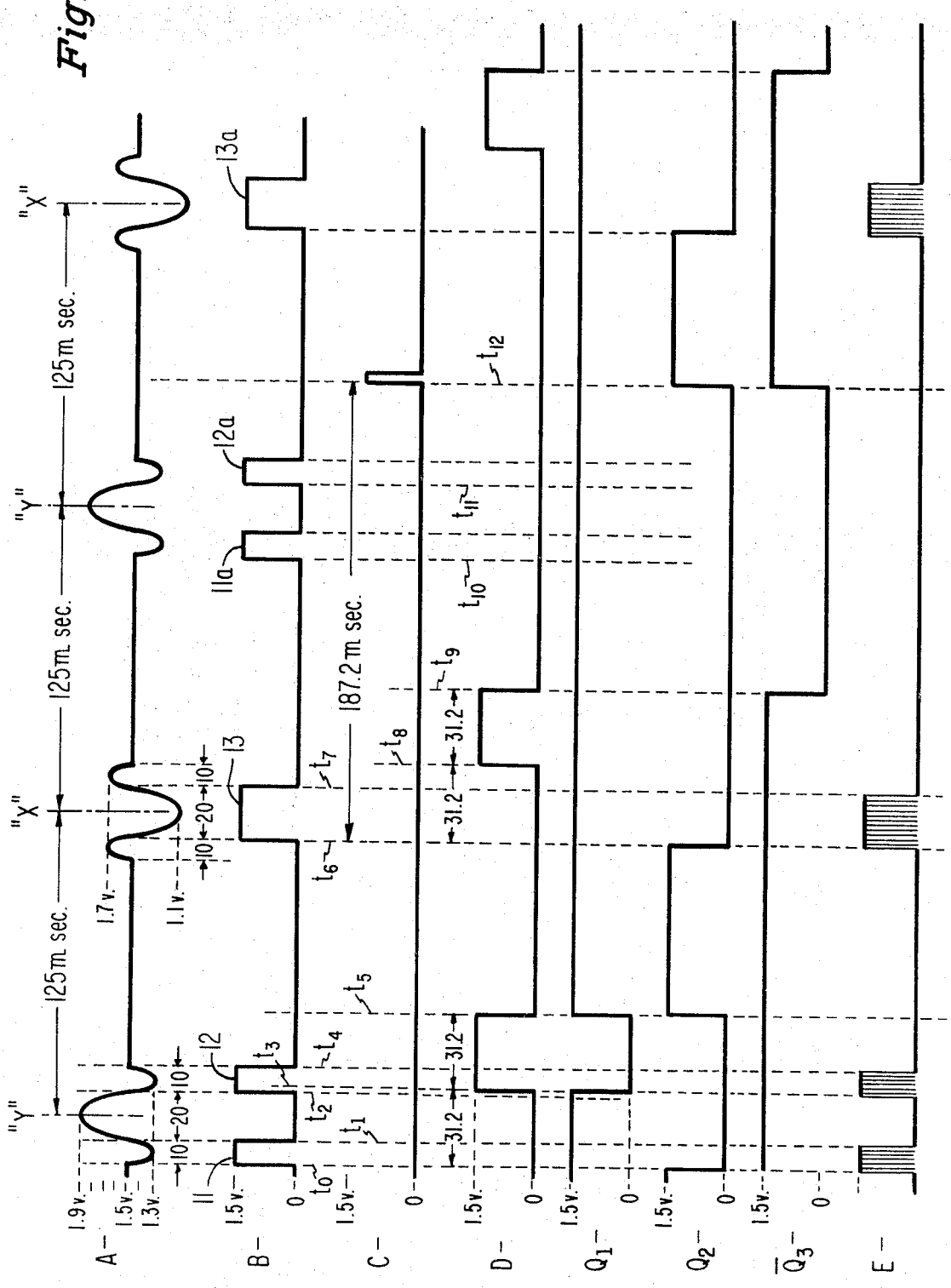

In response to the X and Y signals shown in Waveshape A the network 16 produces two sets or groups of pulses as shown in waveshape B of FIG. 3A. The first set includes single positive going 20 millisecond wide pulses (13, 13a) occuring at intervals of approximately 250 milliseconds. The second set includes two relatively closely spaced positive going 10 millisecond wide pulses (11, 12, 11a, 12a). The pair (11, 12) of pulses occur approximately 20 milliseconds apart and alternate with pulses from the first set. The output B of detector 16 is connected to the reset (R2) input of flip flop No. 2 (FF2) and to the first input (1) of AND gates 34 and 26.

Flip Flop No. 2 (FF2) and flip flop No. 1 (FF1) are set reset flip flops, each flip flop having a set input (S), a reset input (R), and output (Q) and a complementary output ($\overline{Q}$). A high level signal (e.g., ≈1.5 volts) denoted as a logic 1 applied to the R input causes Q to go low (logic 0) and $\overline{Q}$ to go high (logic 1). A high level signal applied to the S input causes Q to go high and $\overline{Q}$ to go low. The Q2 output of FF2 is applied to the reset input (R) of a 5 stage counter 18, to the set input (S1) of FF1 and to the reset input (R3) of flip flop 3 (FF3).

The counter 18 has a clock input terminal 105 to which clock pulses are applied. The clock pulses supplied to the counter have a frequency of 128 HZ. This is equivalent to 1 cycle every 7.8 milliseconds and every count of the counter is thus equal to 7.8 milliseconds. In the description to follow, it will sometimes be assumed for ease of explanation that each cycle is 8 milliseconds long. The counter is triggered (counts) on a negative going clock edge. The counter may be reset by the application of a high level at its R input which causes C1, C2, C3, C4, and C5 to be reset to zero. The C3 output ($2^2$ binary position) of counter 18 is connected to inverter 20 which produces $\overline{C3}$ at its output. The C4 output ($2^3$ binary position) of counter 18 is connected to the first input (1) of AND gate 31 which functions to decode the count of 24 and to the clock input (CL) of FF3. The C5 output ($2^4$ binary position) of counter 18 is connected to the second input (2) of AND gate 31. The output of AND gate 31 which when high indicates the presence of the count of 24 in the counter 18 is applied to the second set input (S2) of FF2.

the output of inverter 20 ($\overline{C3}$) is applied to the first input (1) of NOR gate 25 and the Q3 output of FF3 is applied to the second input (2) of NOR gate 25. The output D of NOR gate 25 is applied to the second input (2) of AND gate 26 and NOR gate 30, respectively. The output of AND gate 26 is applied to the R1 input of FF1 and the output (K) of NOR gate 30 is applied to the first set input (S21) of FF2.

Flip flop No. 3 (FF3) is a clocked flip flop which triggers on a positive going clock edge. The $\overline{Q3}$ output of FF3 is fed back to its D3 input and is applied to the second input (2) of 0, gate 34. FF3 is reset (Q3 = 0. $\overline{Q3}$ = 1) when the input to R is high. Due to the feedback from $\overline{Q3}$ to its D3 input FF3 changes state whenever a positive going signal is applied to its clock input.

The third input (3) of AND gate 34 is connected to terminal 36 to which is applied the motor pulses of the type shown in FIG. 3B. The motor pulses have a repetition rate of approximately 500 pulses per second. One half of the motor pulses are high (1.5 volts) for one-fourth of their period and the other half of the motor pulses are high (1.5 volts) for three-fourths of their period. This particular arrangement of pulses optimizes the frequency stability of the motor. However, symmetrical pulses as well as pulses having different ratios of high to low could also be used.

The output of gate 34 denoted E is connected to the gate electrode of transistor 38. When gate 34 is enabled (B = $\overline{Q3}$ = 1) the pulses present at node 36 are passed to output E. In response to the pulses produced at E, transistor 38 is turned on and off. The motor pulses turning transistor 38 on and off produce signals at A of the type shown in waveform A of FIG. 3B. This last waveform is somewhat idealized in that it does not include the switching transients which occur on the leading and trailing edges of the pulses.

Where transistor 38 is turned on (E = 1) a current pulse is supplied to the coil. That is, current now flows from terminal 12 through the coil and through the source-drain path of the transistor to ground. When transistor 38 is turned off (E = 0) the coil is disconnected from the ground return.

In the description of the operation which follows, it is assumed that the circuit starts from a rest position and that the first cycle sensed by the circuit includes a pulse 11 closely followed by pulse 12 and eventually followed by a pulse 13.

The operation of the circuit of FIG. 2 may best be explained by referring to the waveform shown in FIG. 3. Also, in the discussion to follow a high voltage level (≈1.5 volts) will be referred to as a "high," a logic 1 or 1 and a low voltage level (≈0 volts) will be referred to as a logic 0 or "low" or 0.

Assume first that at time $t_o$ a Y type signal is generated at node 3 causing relatively closely spaced pulses 11 and 12 to be generated at the output of detector 16 as shown in waveform B. Typically, the amplitude of pulses 11 and 12 is 1.5 volts and their pulse width is 10 milliseconds and the elapsed time between the falling edge of pulse 10 and the rising edge of pulse 12 is 20 milliseconds.

The positive going pulse 11 is applied to the reset input (R2) of FF2 and to the first inputs (1) of AND gates 26 and 34. Pulse 11 causes the Q2 output of FF2 to go low (Q2 = 0). When Q2 is low the reset signal is removed from counter 18, enabling the counter to count the clock pulses applied to terminal 105. Q2 low also removes the reset signal from R3 of FF3.

Starting with time $t_0$, the pulse 11 at B and the $\overline{Q3}$ level applied to inputs 1 and 2, respectively, of AND gate 34 are high B = $\overline{Q3}$ = 1). Therefore, the motor pulses applied to terminal 36 are passed to output E of gate 34 causing transistor 38 to go on and off for as long (a period of 10 milliseconds) as pulse 11 is present. As described below only on the first cycle are motor pulses produced at E during an 11 or 12 pulse. Once the circuit has locked in on the pulses denoted 13, no motor pulses are passed to output E during the occurence of subsequent pulse 11 or 12 derived from the Y signals.

From time $t_1$ to time $t_2$ the signal at B is low and E remains low. At time $t_2$ which, as shown in waveform B, occurs approximately 30 milliseconds after $t_0$ pulse 12 goes high. This has no effect on FF2 which was reset by pulse 11 but applied a 1 to the first inputs of AND gates 26 and 34. At time $t_3$ which occurs approximately 31.2 milliseconds after $t_0$, a fourth (128 HZ) clock pulse is applied to counter 18 and the C3 output of counter 18 goes high. (The count of 4, in binary terms, is 00100 where 1 is in the C3 position). When C3 goes high, the output of inverter 20 ($\overline{C3}$) goes low ($\overline{C3}$ = 0). Thus at time $t_3$ $\overline{C3}$ and Q3 which are the two inputs to NOR gate 25 are low causing the output D of NOR gate 25 to go high. At time $t_3$ when D goes high, the two inputs to AND gate 26 are high (B = D = 1) and the gate supplies a high to the R1 input of FF1 causing Q1 to go low. Thus FF1 is reset, that is, Q1 goes from 1 to 0 when two relatively closely spaced pulses (11, 12) are produced at B. At this time NOR gate 30 remains in its previous condition, that is, K = 0 since one of its inputs D is 1 while its other input Q1 is 0. At time $t_4$ (approximately 40 milliseconds after time $t_0$ the pulse 12 returns to 0 (B = 0) which disables AND gates 26 and 34. Note that FF1 remains reset with Q1 = 0.

During the first cycle, that is, the first time pulses 11 and 12 occur prior to the occurrence of a pulse 13, the B and $\overline{Q3}$ inputs to gate 34 are high and motor pulses are passed to output E and applied to the gate electrode of transistor 38. However, after the occurrence of a pulse 13, motor pulses are inhibited from being passed to output E during the presence of subsequent pulses 11 and 12.

At time $t_4$ approximately 62.4 milliseconds after time $t_0$ the counter reaches the count of 8 and the C4 output goes high and the C3 output goes low. The count of 8, in binary terms, is 01000 where 1 is the C4 position. $\overline{C3}$ changes to a 1 and D changes to 0. The two inputs to NOR gate 30 (D = Q1 = 0) now are both 0 so that K changes to a 1. K = 1 applied to the set side (S1) of FF2 causes Q2 to go high (Q2 = 1). Q2 high resets counter 18 to the count of zero (C1 = C2 = C3 = C4 = C5 = 0), resets FF3 causing $\overline{Q3}$ to go high and Q3 to go low and sets FF1 causing Q1 to go high which in turn causes K to return to zero. The circuit has thus been reset to the conditions existing just prior to time $t_0$.

It should be appreciated at this point that the circuit sensed the presence of relatively closely spaced pulses 11 and 12 and prepared the circuit for the next succeeding pulse 13. That is, at time $t_4$ B is high (because of closely spaced pulse 12) when D is high. In response to B = D = 1 the FF1 is reset with Q1 going to 0. Then at time $t_5$ with Q1 still at 0, D changes from 1 to 0 and a set pulse is applied to FF2 which resets the counter and restores the circuit to its initial conditions. This enables the next succeeding pulse 13 to initiate a new cycle At time $t_6$ (approximately 135 milliseconds after $t_0$ and 75 milliseconds after time $t_5$) a pulse 13 corresponding to an X signal is produced at B and current pulses are to be applied to the motor coil 14.

At time $t_6$, $\overline{Q3}$ is high and since B is high, the motor pulses applied to terminal 36 pass through AND gate 34. The output E is applied to the gate electrode of transistor 38 causing current pulses to flow through the coil 14 at the desired time in the desired direction. These pulses are passed from time $t_6$ until time $t_7$ when pulse 13 returns to zero disabling AND gate 34. At time $t_6$ concurrently with the above, the leading edge of pulse 13 resets FF2 and causes Q2 to go low. With Q2 = 0 counter 18 begins counting as explained above.

At time $t_8$ (31.2 milliseconds after time $t_6$ corresponding to the count of 4 and approximately 11.2 milliseconds after the return of pulse 13 to 0), C3 goes high, $\overline{C3}$ goes low and D changes to 1. But now when D goes to 1, B is 0 (since time $t_7$) and AND gate 26 remains disabled and FF1 remains set with Q1 = 1.

At time $t_9$ which occurs 62.4 milliseconds after time t5, C3 changes from 1 to 0 and C4 changes from 0 to 1. The count has gone from 7 (00111) to 8 (01000). The change of C3 to 0 causes D to go from 1 to 0 but the change in D now has no effect on any part of the circuit. The change in C4 from 0 to 1 triggers FF3 and causes Q3 to go to 1 and $\overline{Q3}$ to go to 0. The $\overline{Q3}$ = 0 applied to gate 34 disables it and motor pulses can not pass to output E.

At time $t_{10}$ and $t_{11}$ (approximately 115 and 135 milliseconds, respectively after time $t_6$) pulses 11a and 12a occur but these pulses now have no effect on the circuit and are effectively blanked out. The high at B produced by pulses 11a and/or 12a is applied to FF2 but it has no effect since FF2 is already reset (Q2 = 0) and the output of gate 34 is maintained at E 32 0 since the gate is disabled by $\overline{Q3}$ is 0. It is important to note that in response to a single pulse 13 succeeding pulses 11 and 12 are prevented from in any way affecting the circuit. Only pulses of similar type to pulse 13 and occurring with approximately the same periodicity as pulse 13 will cause motor pulses and current pulses to be supplied to the coil.

At time $t_{12}$ counter 18 reaches the count of 24, in binary terms 11000, with C5 and C4 both 1. Time $t_{12}$ occurs 187.2 milliseconds after time $t_6$ and $t_{12}$ is approximately 50 milliseconds after the falling edge of pulse 12a. At time $t_{12}$ AND gate 31 which in effect is a decoder of the 24 count produces a 1 which is applied to the S2 input of FF2. The 1 applied to S2 of FF2 sets the flip flop causing Q2 to go to 1. The high signal on Q2 resets counter 18 and FF3 and maintains FF1 set. Therefore, C1 through C5 go to zero, Q3 goes to 0, $\overline{Q3}$ goes to 1 and Q1 remains at 1.

The circuit is now in condition to receive the next positive going pulse on waveform B. The next pulse is pulse 13a and the cycle just described from time $t_6$ to time $t_{12}$ will be repeated with pulses 11 and 12 being excluded from affecting the output E.

When starting from a standstill position, the first pulse to the circuit is a pulse 12, the circuit cycles blanking the succeeding pulse 13 and then allows the next succeeding 11 and 12 type pulses following which the circuit locks in on the 13 type pulse. This is demonstrated as follows. Assume that the first pulse present at B is a pulse 12. This resets FF2 causing Q2 to go low and counter 18 starts counting. With pulse B high, gate 34 is enabled since $\overline{Q3}$ is also high and the motor pulses will be passed to E and applied to transistor 38. Four counts of counter 18 later (approximately 31.2 milliseconds after the leading edge of pulse 12) C3 goes high causing D to change from zero to 1. However, at this time Q1 remains high and B is zero and the outputs of gates 26 and 30 remain low and there are no changes. The counter 18 continues counting until it reaches the count of 8 (approximately 62.4 milliseconds after the leading edge of pulse 12). The C4 output then changes from zero to 1 causing FF3 to change state. That is, Q3 becomes 1, $\overline{Q3}$ changes from 1 to 0. Since Q3 is high, D is low and will remain low until Q3 changes state. The next succeeding pulse 13 to occur, approximately 105 milliseconds after the preceding pulse 12, can not affect the circuit or the output at E. For, when the pulse 13 is applied to FF2 the latter is already in its reset state due to the preceding pulse 12. Also, since $\overline{Q3}$ is 0 gate 34 is disabled and FF1 is already set.

However, at the count of 24 ($\approx$187 milliseconds after the application of a first pulse 12) the C4 and C5 counter outputs go high setting FF2 which causes counter 18 to be reset to zero and FF3 to be reset such that Q3 is low and $\overline{Q3}$ is high. The circuit is now ready to receive the next succeeding pulses 11 and 12. One cycle of these pulses as explained above pass through the circuit but the circuit locks in on the next pulse 13 succeeding the pair of pulses 11 and 12. Once the circuit is locked in on the type of pulse 13 any further pulse 11 and 12 are inhibited as described above and no longer affect the circuit.

In summary, in the operation of the circuit, the circuit senses and locks in on a desired pulse and blocks undesired pulses such as 11 and 12 which are relatively closely spaced and which occur in the interval between two desired pulses.

The AND gates shown in FIG. 2 may in practice be comprised of a NAND gate in series with an inverter. Similarly, the flip flops 1 and 2 may be comprised of two cross coupled NOR gates. It should also be evident that the circuit may be fabricated using many alternative logic arrangements without departing from the scope of the invention.

In a test circuit flip flops 1 and 2 as well as all the other logic gates were formed from gates bearing RCA part number TA 5987 which corresponds functionally to RCA components bearing the part number CD 4007A. The counters and flip flop No. 3 were made from parts bearing RCA part number TA 5938, TA 5939, corresponding functionally to components bearing RCA designation CD 4020A. The standard counter circuits were modified to provide an output corresponding to the count of 4. The test circuits employed complementary metal oxide semiconductor (C-MOS) devices made by the silicon gate process. This enables the manufacture of low power dissipation devices operable at very low operating potential (e.g., 1.5 volts). The silicon gate process enables the manufacture of semiconductor devices having very low threshold voltages which can therefore operate at low operating potentials.

Figures 5A, 5B:
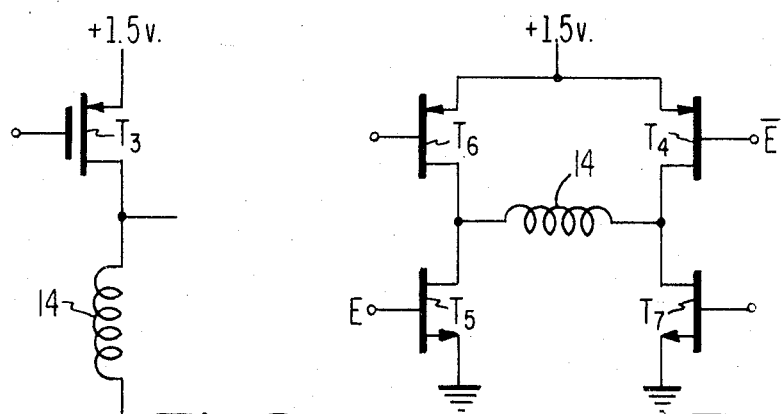
FIGS. 5A and 5B illustrate different circuit arrangements for supplying current pulses to the coil 14 of FIGS. 1 and 2.

As shown in FIG. 5A, the coil can be connected in series with a P-type transistor switch T3 such that one end of the coil is permanently connected to ground and enabling the positive side of the power supply to be periodically applied to the other end of the coil. Where the transistor is connected as shown in FIG. 5A similar operation to that described for FIG. 2 is obtained if the pulses applied to the gate electrode of transistor T3 are the inverse ($\overline{E}$) of the pulses applied to transistor 38.

In the bridge circuit of FIG. 5B pulses could be supplied to the coil during both the X and Y pulses. Transistors T4 and T5 would be turned on when a pulse of the type illustrated by pulse 13 is present and transistors T6 and T7 would be turned on during the time interval corresponding to the time interval between the falling edge of pulse 11 and the rising edge of pulse 12. During the presence of the X pulses current pulses would be supplied in one direction through the coil and during the presence of the Y pulses current pulses would be supplied in the opposite direction through the coil. However, this circuit may be somewhat inefficient because there are two transistors in series with the coil and where the operating potential is low the voltage drops across the transistors result in that much less voltage across the coil. Also, this scheme requires four transistors as opposed to the single transistor shown in FIG. 2 or in FIG. 5A.

It may also be noted that the variation of the A wave due to the superimposition thereon of the motor pulses as shown in FIG. 3B does not alter the operation of the circuit. In response to pulses of the type denoted as pulse 13 the variations at A also occur with the signal at B and at E. Also, since FF2 is reset by the leading edge of the pulse 13 any negative going pulse applied to R2 has no effect on the flip flop.

Though the waveform A as illustrated herein result from the reciprocating rotation of a magnet over a coil, it should be evident that the invention is not limited to signals produced by these means or to exactly those signals.

Also, though the invention as illustrated herein includes means for discriminating between two groups of pulses where one group consists of a single pulse and the second group includes two pulses, it should be evident (at least when the circuit is locked in to the single pulse 13) that the second group of pulses could include more than two closely spaced pulses.

What is claimed is:

1. The combination comprising:
   a load;
   first means, coupled to said load, which when enabled supplies current pulses to said load;
   a signal input terminal coupled to said load for receiving a train of pulses derived from said load having a periodic pattern of a single pulse followed by at least two relatively closely spaced pulses, and
   means coupled to said signal input terminal for sensing said closely spaced pulses and for in response to the next occurring single pulse enabling said first means and said means including means responsive to said single pulse for inhibiting the closely spaced pulses from enabling said first means.

2. The combination as claimed in claim 1 further including two terminals for the application therebetween of a source of operating potential wherein said load includes a coil connected at one end to one of said two terminals and wherein said first means includes a switch connected between the other end of said coil and the other one of said two terminals.

3. The combination as claimed in claim 2 wherein a zero level detector is connected between the junction of said coil and said switch and said signal input terminal, wherein the zero level detector converts the signals generated at said junction into said periodic pattern of a single pulse followed by a pair of relatively closely spaced pulses.

4. The combination as claimed in claim 2 further including means rotatably mounted adjacent to said coil; wherein the current pulses supplied to said coil sustain the oscillatory motion of said rotatably mounted means; and wherein the oscillation of said rotatably mounted means across said coil induce in said coil alternating X and Y signals where the X signal is the mirror image of the Y signal.

5. The combination as claimed in claim 4 wherein said rotatably mounted means is part of a balance wheel and includes a magnet.

6. The combination as claimed in claim 1 wherein said means for sensing the closely spaced pulses includes a flip flop and a counter, wherein said counter includes means for in response to a first pulse producing a time $t_1$ after said first pulse a given binary level for a period T1; and wherein said means for sensing includes means responsive to said level and to the concurrent presence of a second pulse relatively closely spaced to said first pulse occurring during said period T1 for putting said flip flop in a condition to change in response to a subsequent pulse.

7. The combination as claimed in claim 6 wherein said subsequent pulse is a single pulse and wherein in response to said single pulse said counter generates a time $t_2$ after the occurrence of said single pulse a signal for inhibiting the supply of current pulses during the presence of the next occurring closely spaced pulses; and wherein a time $t_3$ after the occurrence of said single pulse where time $t_3$ is later than time $t_2$ and occurs after the occurrence of said relatively closely spaced pulses the counter is reset to zero and said flip flop is put in a condition to begin a new cycle.

8. The combination comprising:
coil;
means rotatably mounted adjacent to said coil for, per each cycle of rotation of said means, alternately inducing first and second signals across said coil in response to a first or a second direction of rotation, respectively;
first means coupled to said coil for when enabled supplying current pulses to said coil for sustaining the oscillatory motion of said rotatably mounted means;
digitizing means coupled to said coil for sensing said first and second types of signals and for producing in response thereto first and second sets of pulses, where said first set includes a single pulse per cycle and said second set includes at least two relatively closely spaced pulses per cycle; and
second means coupled to said digitizing means for sensing said second set of pulses and for in response to the next occurring pulse from said first set enabling said first means and said second means including means responsive to said first set of pulses for inhibiting the second set of pulses from enabling said first means.

9. The combination comprising:
a coil;
means rotatably mounted adjacent to said coil for, per cycle, alternatively including first and second signals across said coil in response to a first or a second direction of rotation, respectively;
digitizing means coupled to said coil for sensing said first and second types of signals and for producing in response thereto first and second sets of pulses, where said first set includes a single pulse per cycle and said second set includes at least two relatively closely spaced pulses per cycle; and
second means coupled to said digitizing means for in response to said first set of pulses supplying current pulses of first polarity to said coil and for in response to said second set of pulses supplying current pulses to said coil of second polarity opposite to that of said first polarity, said supply of current pulses for causing the continued oscillation of said rotating means.

* * * * *

UNITED STATES PATENT OFFICE
CERTIFICATE OF CORRECTION

Patent No. 3,787,715                Dated January 22, 1974

Inventor(s) Sargent Sheffield Eaton, Jr.

It is certified that error appears in the above-identified patent and that said Letters Patent are hereby corrected as shown below:

```
Col. 2, line 25    "saif" should be --- said ---
        line 27    "curren" should be --- current ---
        line 29    "puses" should be --- pulses ---
        line 30    "inpart" should be --- in part ---
        line 31    "teh" should be --- the ---
        line 31    "basisof" should be --- basis of ---
Col. 3, line 39    "(logic 0̄)" should be (logic 0) ---
Col. 4, line 2     "input" should be --- inputs ---
        line 10    "of 0," should be --- of AND ---
        line 48    "waveform" should be --- waveforms ---

Col. 5, line 17, "applied" should read -- applies -- .

Col. 6, line 38    "E 32 0" should be --- E = 0 ---
Col. 8, line 34    "result" should be --- results ---
Claim 1, line 9    before "means" insert --- second ---
         line 12   after "said" insert --- second ---
Claim 8, line 2    before "coil" insert --- a ---
```

Signed and sealed this 6th day of August 1974.

(SEAL)
Attest:

McCOY M. GIBSON, JR.            C. MARSHALL DANN
Attesting Officer               Commissioner of Patents